United States Patent [19]
Wheatley, III

[11] Patent Number: 5,469,471
[45] Date of Patent: Nov. 21, 1995

[54] METHOD AND APPARATUS FOR PROVIDING A COMMUNICATION LINK QUALITY INDICATION

[75] Inventor: Charles E. Wheatley, III, Del Mar, Calif.

[73] Assignee: QUALCOMM Incorporated, San Diego, Calif.

[21] Appl. No.: 190,517

[22] Filed: Feb. 1, 1994

[51] Int. Cl.⁶ .................................................. H04J 13/02
[52] U.S. Cl. .................... 375/205; 455/226.4; 348/725; 367/119; 380/34
[58] Field of Search ........................ 375/1, 205; 379/63; 455/226.2, 226.3, 233.1, 52.1, 25, 33.1, 67.5, 67.6, 67.7, 226.4; 342/359; 380/34; 367/119; 348/725

[56] References Cited

U.S. PATENT DOCUMENTS

| | | | |
|---|---|---|---|
| 4,893,288 | 1/1990 | Maier et al. | 342/359 X |
| 5,056,109 | 10/1991 | Giohousen et al. | 375/1 |
| 5,093,840 | 3/1992 | Schilling | 375/1 |
| 5,093,923 | 3/1992 | Leslie | 455/67.2 X |
| 5,216,692 | 6/1993 | Ling | 375/1 |
| 5,239,684 | 8/1993 | Ishikura | 455/226.2 X |

OTHER PUBLICATIONS

Vander Horst, Alignment Squeaker 'or an' Audible Signal–Strength Indicator; Oct. 1976, p. 1029.

*Primary Examiner*—Tod R. Swann
*Attorney, Agent, or Firm*—Russell B. Miller; Kenneth W. Bolvin

[57] ABSTRACT

A link quality improvement system for a cellular communication system in which portable units are used to facilitate communication of information signals between system users, via at least one cell-site, using code division multiple access spread spectrum communication signals. The system enables users to improve the quality of reverse communication links from the portable units to the cell-site by providing to each system user a link quality signal indicative of power received at the cell-site relative to an optimum level of received power. At a cell-site communicating with a portable unit associated with a particular system user, the portable unit transmitted power is measured as received at the cell-site. A command signal is generated at the cell-site and transmitted to the portable unit for adjusting portable unit transmitter power. The command signals are also accumulated in order to enable generation of a link quality signal in response thereto. In a preferred implementation the link quality signal is an audible interference signal inducing the system user to adjust orientation of the portable communication unit so as to improve signal quality on the reverse link.

34 Claims, 5 Drawing Sheets

METHOD AND APPARATUS FOR PROVIDING A COMMUNICATION LINK QUALITY INDICATION

BACKGROUND OF THE INVENTION

I. Field of the Invention

The present invention relates to cellular communication systems. More specifically, the present invention relates to a method and apparatus providing a communication link quality indication within a communication system, and in a particular case within a code division multiple access (CDMA) cellular communication system, thereby enabling improved signal transmission quality within the system.

II. Description of the Related Art

The use of code division multiple access (CDMA) modulation techniques is one of several techniques for facilitating communications in which a large number of system users are present. Although other techniques such as time division multiple access (TDMA) frequency division multiple access (FDMA) and AM modulation schemes such as amplitude companded single sideband (ACSSB) are known, CDMA has significant advantages over these other techniques. The use of CDMA techniques in a multiple access communication system is disclosed in U.S. Pat. No. 4,901,307 entitled "SPREAD SPECTRUM MULTIPLE ACCESS COMMUNICATION SYSTEM USING SATELLITE OR TERRESTRIAL REPEATERS", assigned to the assignee of the present invention, the disclosure thereof incorporated by reference.

In the just mentioned patent, a multiple access technique is disclosed where a large number of mobile telephone system users each having a transceiver communicate through satellite repeaters or terrestrial base stations (also known as cell-sites stations, or for short cell-sites) using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques. In a CDMA system, increases in system capacity may be realized by controlling the transmitter power of the portable units associated with each user so as to reduce interference to other system users.

The CDMA receivers of the cell-site operate by converting a wideband CDMA signal from a corresponding one of the portable unit transmitters into a narrow band digital information carrying signal. At the same time, other received CDMA signals using the same frequency that are not selected remain as wideband noise signals. The bit-error-rate performance of the cell-site receiver is thus determined by the ratio of the power of the desired signal to that of the undesired signals received at the cell-site, i.e., the received signal power in the desired signal transmitted by the selected portable unit transmitter to that of the received signal power in undesired signals transmitted by the other portable unit transmitters. The bandwidth reduction processing, a correlation process which results in what is commonly called "processing gain", increases the signal to noise interference ratio from a negative value to a positive value thus allowing operation within an acceptable bit-error-rate.

In a terrestrial CDMA cellular communication system it is extremely desirable to maximize the capacity in terms of the number of simultaneous communication links capable of being supported by a given system bandwidth. System capacity can be maximized if the transmitter power of each portable unit is controlled such that the transmitted signal arrives at the cell-site receiver at the minimal signal to noise interference ratio which allows acceptable data recovery. If a signal transmitted by a portable unit arrives at the cell-site receiver at a power level that is too low, the bit-error-rate may be too high to permit high quality communications. On the other hand if the mobile unit transmitted signal is at a power level that is too high when received at the cell-site receiver, communication with this particular mobile unit will be acceptable. However, this high power signal acts as interference to other mobile unit transmitted signals that are sharing the same channel, i.e. frequency spectrum. This interference may adversely affect communications with other portable units unless the total number of communicating portable units is reduced.

In the terrestrial application of CDMA communication techniques, the portable unit (e.g., mobile telephone or personal communication instrument) transceiver measures the power level of the signal received from a cell-site station. Using this power measurement, the portable unit transceiver can estimate the path loss of the channel between the portable unit and the cell-site station. The portable unit transceiver then determines the appropriate transmitter power to be used for signal transmissions between the portable unit and the cell-site station, taking into account the path loss measurement, the transmitted data rate and the cell-site receiver sensitivity.

The signals received from each portable unit at the cell-site station are measured, and the measurement results compared with a desired power level. Based on this comparison the cell-site determines the deviation in the received power level from that which is necessary to maintain the desired communications. Preferably the desired power level is a minimum power level necessary to maintain quality communications so as to result in a reduction in system interference. Instead of measuring the signal strength of each signal comparing the result with a desired power level, other criteria could be used to determine the power adjustment commands. For instance the criteria could be a signal-to-noise ratio, data error rate, or audio quality.

The cell-site station then transmits a power control command signal to each system user so as to adjust or "fine tune" the transmit power of the portable unit. This command signal is used by the portable unit to change the transmit power level closer to a predefined level required to sustain communication on the reverse link i.e. the link from the portable unit to the cell-site. As channel conditions change, typically due to motion of the portable unit, both the portable unit receiver power measurement and the power control feedback from the cell-site station continually readjust the transmit power level so as to maintain a proper power level.

In a terrestrial CDMA communication system the maximum range at which communication may be supported between the cell-site and a particular portable unit is proportional to the power capable of being transmitted by the portable unit on the reverse link. Although existing techniques for power control provide for acceptable communication quality when the portable unit is displaced from the cell-site by less than its maximum range of transmission, the maximum transmission range on the reverse link could be increased if a user were provided an indication of which orientations of the portable unit resulted in higher transmission gain on the reverse link.

Unfortunately, however, known CDMA power control techniques do not provide means for adjusting the position or orientation of the portable unit so as to increase the strength of the signal transmitted over the reverse link from a portable unit to the cell-site. A primary reason for providing such control would be to improve signal transmission in those instances where the portable unit is separated from the cell-site by a distance approximately equivalent to the maximum transmission range of the portable unit. If in such locations the reverse channel link is disadvantaged the maximum transmission power of the portable unit may be insufficient to provide a reverse link signal of the requisite strength to the cell-site. Accordingly, the cell-site would operate to send a continuous stream of power control command signals to the portable unit specifying that the power of the signal transmitted thereby be increased. This would continue until, for example, transmission conditions on the reverse link improved or the orientation of the portable unit were adjusted so as to increase the strength of the signal received by the cell-site. Under such circumstances there is an increased likelihood of an abrupt "break", i.e., extinction, of the communication link between the cell-site and the portable unit, the occurrence of which obviously degrades system performance.

It is therefore an object of the present invention to provide a novel and improved method and apparatus for improving signal transmission quality in a CDMA communication system by supplying a user with an indication of communication quality over the reverse link, thereby enabling the orientation of the portable unit to be adjusted by the user so as to maximize reverse link transmission gain.

SUMMARY OF THE INVENTION

In a terrestrial CDMA communication system, it is desirable that the transmitter power of the portable units be controlled so as to produce at the cell-site receiver an identical, nominal, received signal power from each and every portable unit transmitter operating within the cell. Should all of the portable unit transmitters within an area of coverage of the cell-site have transmitter power controlled accordingly, the total signal power received at the cell-site would be equal to the nominal received power of a portable unit transmitted signal multiplied by the number of portable units transmitting within the cell. To this is added the noise power received at the cell-site from portable units in adjacent cells.

As mentioned previously, in existing CDMA communication systems the transmitter power is also controlled by a signal from the cell-site. Each cell-site receiver measures the strength of the signal, as received at the cell-site, from each portable unit with which the cell-site is in communication. The measured signal strength is compared to a desired signal strength level for that particular portable unit. A power adjustment command is generated and sent to the portable unit in the forward link i.e. the link from the cell-site station to the portable unit.

In an exemplary system the rate of transmission of the power adjustment command is high enough to permit tracking on the reverse link of slow fading, as well as of changes in portable unit orientation. A fading characteristic may be caused by the signal being reflected from many different features of the physical environment. As a result, several signal components may arrive almost simultaneously at the cell-site receiver from many directions with different transmission delays. At the UHF frequency bands usually employed for portable radio communications, including those of cellular mobile telephone systems, significant phase differences in signals traveling on different paths may occur.

The possibility for destructive summation of the signals may result, with on occasion deep fades occurring. A small change in the position or orientation of the mobile unit slightly changes the physical delays of all the signal propagation paths, which results in a different phase for each path. Such signal fading on the reverse link may be exacerbated by spatial nonuniformity in the gain pattern of the portable unit, as well as by movement of the portable unit through the environment.

In order to account for the independence of fading on the reverse and forward links, the portable unit transmitter power is controlled by the power adjustment command from the cell-site. This power adjustment command is combined with the one-way channel condition estimate made within the portable unit to obtain the final value of the portable unit transmitter power. Various techniques for providing such one-way estimates of channel condition are described in, for example, the above-referenced U.S. Pat. No. 4,901,307 and in U.S. Pat. No. 5,056,109 entitled "METHOD AND APPARATUS FOR CONTROLLING TRANSMISSION POWER IN A CDMA CELLULAR MOBILE TELEPHONE SYSTEM", assigned to the assignee of the present invention, the disclosure thereof incorporated by reference.

The power adjustment command signal is transmitted, in an exemplary embodiment every 1.25 milliseconds. In response to the cell-site power adjustment command, the portable unit increases or decreases the portable unit transmitter power by a predetermined amount, nominally 1 dB. The power adjustment command is transmitted by overwriting a portion of the signal normally used to transmit data. The modulation system employed in CDMA systems is capable of providing correction coding for user data bits. The overwrite by the power adjustment command is treated as a channel bit error or erasure and corrected by the error correction as decoded in the portable unit receiver. Error correction coding on the power adjustment command bits in many cases may not be desirable because of the resulting increased latency in reception and response to the power adjustment command. It is also envisioned that time division multiplexing for transmission of the power adjustment command bits may be used without overwriting user data channel symbols.

The channel error rate can be used to determine the minimum strength, as received at the cell-site, of signals transmitted by each portable unit. The desired signal strength level values for signals transmitted by the portable units are provided to each of the cell-site receivers so as to obtain a desired channel error rate. The desired signal strength value is then used for comparing with the measured minimum signal strength value in generating the power adjustment command.

A system controller is utilized to command each cell-site processor as to the value of desired signal strength to use. The nominal power level can be adjusted up or down to accommodate variations in the average conditions of the cell. For example, a cell-site positioned in an unusually noisy location or geographic region might be allowed to use a higher than normal reverse power level. It is further understood that the cell-site processor may monitor the average bit-error-rate. This data may be used by the system controller to command the cell-site processor to set an appropriate reverse link power level to assure acceptable quality communications. The system controller will ensure that when communication with a particular portable unit is transferred, or "handed-off", between cell-sites the specified reverse link power level will be the same for each cell-site.

As noted above, known CDMA power control techniques involve regulation of transmitter gain, but do not provide means for adjusting the position or orientation of the portable unit so as to increase the strength of the signal transmitted over the reverse link from a portable unit to the cell-site. Under adverse signal transmission conditions on the reverse link it is possible that the portable unit would be oriented such that its maximum transmission power would be insufficient to provide a reverse link signal of the requisite strength to the cell-site. This situation would most likely arise when the portable unit is separated from the cell-site by a distance approximately equivalent to its maximum transmission range. In this circumstance the cell-site would operate to send a continuous stream of power-up command signals to the portable unit in an unsuccessful effort to increase the power transmitted by the portable unit.

In accordance with the invention, each system user is provided with a link quality signal indicative of the power received by the cell-site over the reverse link from the portable unit associated with the user. In a preferred embodiment the link quality signal will indicate that the level of signal power received at the cell-site is less than a predetermined optimum level of received power. More particularly, in the preferred embodiment the link quality signal is generated in response to the power adjustment commands transmitted by the cell-site to the associated portable unit. Means are provided for accumulating a set of the received power adjustment commands and for generating a link quality signal having a magnitude inversely related to the average value of the accumulated set of commands. The average value of the received commands will be nonzero when a plurality of power-up commands are sequentially accumulated, and hence outnumber any power-down commands accumulated during a particular accumulation interval. The link quality signal may be conveyed to the user in the form of, for example, an audible interference signal or a visual representation of cell-site received power. In a preferred embodiment such an audible interference signal is combined with the audible output signal produced by the portable unit receiver. Because the magnitude of the interference signal is an inverse function of the signal power received by the cell-site over the corresponding reverse transmission path, the user will be induced to position the portable unit so as to minimize the level of audible interference and thereby maximize the signal power received by the cell-site. In present systems the only audible interference to which the user is subjected is due to degradation of the forward link. Accordingly, in conventional systems the orientation of the portable unit is adjusted only as a means of improving reception of signals transmitted over the forward link. In contrast, the present invention may be utilized to improve the quality of signal transmission over the reverse links between each portable unit and a cell-site within a CDMA communication system. In conventional cellular systems the weakest link for a portable unit is the reverse link due to the portable unit's limited transmit power.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
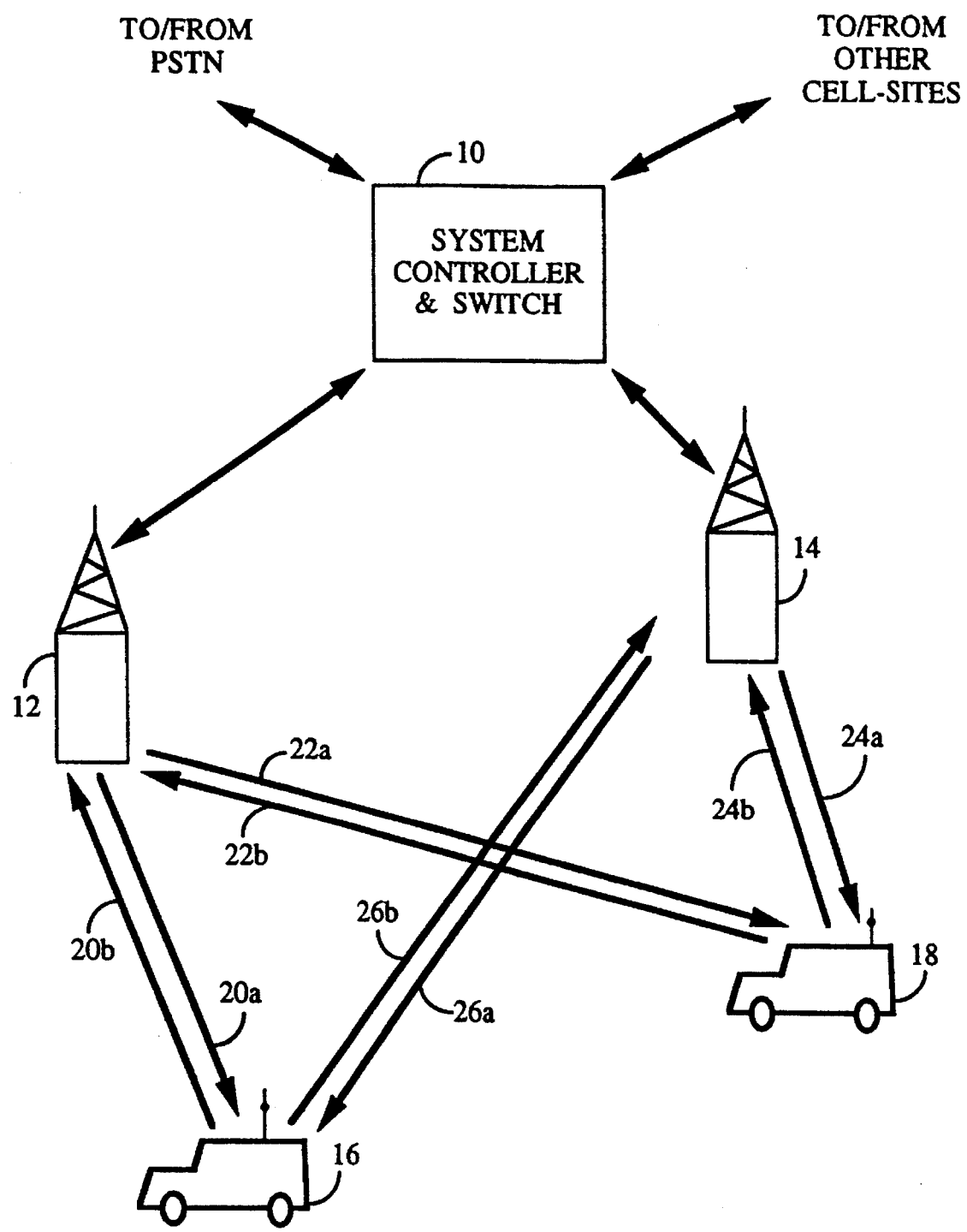
FIG. 1 is a schematic overview of an exemplary cellular telephone system which including at least one cell-site and a plurality of portable units.

An exemplary terrestrial cellular telephone communication system in which the present invention is embodied is illustrated in FIG. 1. The system illustrated in FIG. 1 utilizes CDMA modulation techniques in communications between the system portable user, and the cell-sites. Cellular systems in large cities may have hundreds of cell-site stations serving hundreds of thousands of portable transceivers units (e.g., portable telephones). The use of CDMA techniques readily facilitates increases in user capacity in systems of this size as compared to conventional FM modulation cellular systems. An exemplary CDMA modulation scheme is disclosed in U.S Pat. No. 5,103,459 entitled "SYSTEM AND METHOD FOR GENERATING SIGNAL WAVEFORMS IN A CDMA CELLULAR TELEPHONE SYSTEM", assigned to the assignee of the present invention, the disclosure thereof incorporated by reference.

In FIG. 1, system controller and switch 10, typically includes appropriate interface and processing hardware for providing system control information to the cell-sites. Controller 10 controls the routing of telephone calls from the public switched telephone network (PSTN) to the appropriate cell-site for transmission to the appropriate portable unit. Controller 10 also controls the routing of calls from the portable units via at least one cell-site to the PSTN. Controller 10 may direct calls between portable users via the appropriate cell-site stations because such portable units do not typically communicate directly with one another.

Controller 10 may be coupled to the cell-sites by various means such as dedicated telephone lines, optical fiber links or by radio frequency communications. In FIG. 1, two exemplary cell-sites, 12 and 14, are shown along with two exemplary portable units 16 and 18. Arrows 20a–20b and 22a–22b respectively define the possible communication links between cell-site 12 and portable units 16 and 18. Similarly, arrows 24a–24b and arrows 26a–26b respectively define the possible communication links between cell-site 14 and portable units 18 and 16. Cell-sites 12 and 14 normally transmit using equal power.

Portable unit 16 measures the total power received from cell-sites 12 and 14 upon paths 20a and 26a. Similarly, portable unit 18 measures the power received from cell-sites 12 and 14 upon paths 22a and 24a. In each of portable units 16 and 18, signal power is measured in the receiver where the signal is a wideband signal. Accordingly, this power measurement is made prior to correlation of the received signal with a pseudonoise (PN) spectrum spreading signal.

When portable unit 16 is closer to cell-site 12, the received signal power will be dominated by the signal traveling path 20a. When portable unit 16 is nearer to cell-site 14, the received power will be dominated by the signal traveling on path 26a. Similarly, when portable unit 18 is closer to cell-site 14, the received power will be dominated by the signal on path 24a. When portable unit 18 is closer to cell-site 12, the received power will be dominated by the signal traveling on path 22a.

Each of portable units 16 and 18 uses the resultant measurement, together with knowledge of the cell-site transmitter power and the portable unit antenna gain to estimate the path loss to the closest cell-site. The estimated path loss, together with knowledge of the portable antenna gain and the cell-site antenna and noise figure is used to determine the nominal transmitter power required to obtain the desired carrier-to-noise ratio in the cell-site receiver. The knowledge by the portable units of the cell-site parameters may be either fixed in memory or transmitted in cell-site information broadcast signals, setup channel, to indicate other than nominal conditions for a particular cell-site.

As a result of the determination of the portable unit nominal transmit power, in the absence of fading and assuming perfect measurements, the portable unit transmitted signals will arrive at the nearest cell-site precisely at the desired carrier-to-noise ratio. Thus the desired performance will be obtained with the minimum amount of portable unit transmitter power. The minimization of the portable unit transmitted power is important in a CDMA system because each portable unit causes interference to every other portable unit in the system using the same frequency spectrum. In minimizing the portable unit transmitter power, system interference will be held to a minimum, thus allowing additional portable users to share the frequency band. Accordingly, system capacity and spectral efficiency is maximized.

Figure 2A:
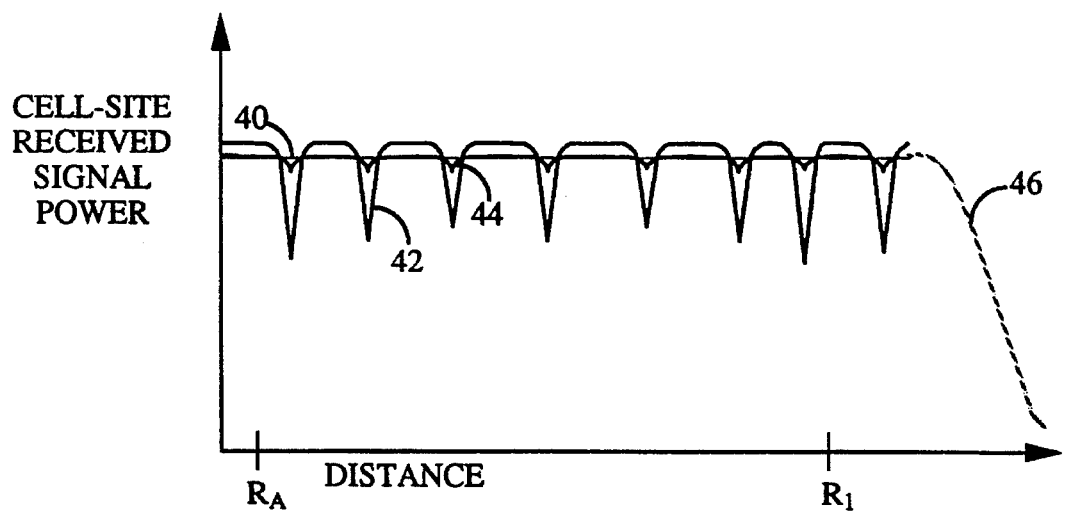
FIG. 2 graphically illustrates cell-site received signal strength with respect to transmissions of the portable unit as a function of distance.

FIG. 2A is a graph illustrating the cell-site received signal power strength from a portable unit as it travels away from the cell-site. Curve 40 indicates the desired average received signal power at the cell-site for a signal transmitted from a portable unit. The portable unit transmitted signal often experiences fading before arriving at the cell-site receiver. Curve 42 represents the fading that occurs on the reverse link signal.

When a portable unit is located where the forward link is not faded but yet the reverse link is severely faded, communications would be disrupted unless an additional mechanism was employed to compensate for differences in reverse and forward link channel. The closed loop power adjustment command process employed at the cell-site is such a mechanism. In FIG. 2A, curve 44 illustrates the portable unit reverse link signal power as when compensating for average path loss and fading on both the forward and reverse link channels. As can be seen in FIG. 2A curve 44 follows close to curve 40 except for instances of severe fading where the fading process is minimized by the closed loop control.

Referring again to FIG. 2A, dashed curve 46 represents the received signal power as received at the cell-site when the portable unit is located in excess of a maximum transmission range $R_1$ from the cell-site. The maximum transmission range $R_1$ corresponds to the range at which, for a given orientation of the portable unit transmitting apparatus, the maximum transmission power of the portable unit is insufficient to provide the cell-site with desired power level indicated by curve 40. In accordance with the invention, a link quality signal indicative of the transmitted signal power received at the cell-site is provided to the user of the portable unit when the portable unit is operating at or near its limit of maximum transmission power. In a preferred embodiment the link quality signal is provided in the form of an audible interference signal to the system user, and is of a magnitude inversely related to the rate at which the cell-site issues "power-up" commands to the portable unit. In this way the system user is induced to adjust the orientation of the portable unit so as to improve signal transmission quality over the reverse link, thereby reducing the rate at which the cell-site issues power-up commands. In this way the magnitude of the link quality signal is reduced in response to adjustments in orientation of the portable unit which lead to improved communication quality on the reverse link.

As is described in further detail below, in an exemplary implementation the level of the reverse link signal transmitted by the portable unit is regulated by a control signal proportional to an automatic gain control (AGC) signal. The AGC signal is based on the forward link power received by the portable unit. This control mechanism is well suited to situations in which the signal propagation characteristics of the reverse and forward links are substantially similar. However, when the propagation characteristics of the reverse link deviate from those of the forward link, the AGC signal will no longer appropriately regulate the signal power on the reverse link. That is, the signal power received at the cell-site will be either greater or less than an optimal value. In response, power control commands transmitted from the cell-site to the are used by the portable unit to synthesize a transmit gain adjust (TX GAIN ADJ) signal used to control the reverse link power. The TX GAIN ADJ signal will typically be generated on the basis of the average value of the power control commands included within a set of power control commands accumulated by the portable unit. When the propagation characteristics of the reverse and forward links are within expected ranges, each accumulated set of power control commands will include approximately equivalent numbers of power increase and power decrease (e.g., logical 1 and 0) commands, resulting in a static value of TX GAIN ADJ. As is described in further detail below, in a preferred embodiment the magnitude of the link quality signal is set on the basis of the magnitude of the TX GAIN ADJ signal.

Figure 2B:
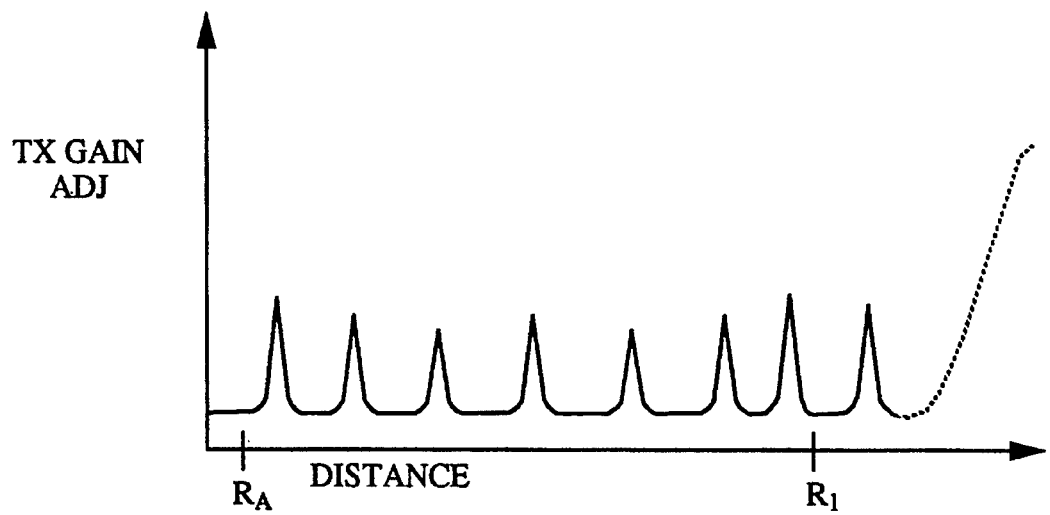

FIG. 2B is a graph providing an exemplary illustration of the magnitude of the TX GAIN ADJ signal as the portable unit travels from the cell-site. As is indicated by FIG. 2B, when the portable unit is within the range $R_1$, the value of TX GAIN ADJ will be perturbed from a nominal value of zero in accordance with the variation in cell-site received power generally indicated by curve 42 (FIG. 2A). However, when the portable unit becomes located outside of the range $R_1$, the value of TX GAIN ADJ increases in proportion to the corresponding decrease in cell-site received signal power graphically illustrated by curve 46. In this situation it may not be possible to obtain the transmit power necessary to supply to the cell-site the desired level of received power. Accordingly, in a preferred embodiment the link quality signal will assume a nonzero value, e.g., will become audible as an interference signal, when the value of TX GAIN ADJ exceeds a predefined minimum threshold $TX_{min}$. In this way the system user will be induced to adjust orientation of the portable unit in an effort to decrease the level of the audible interference signal by increasing the cell-site received signal power. If the user does not make such an orientation adjustment the level of the audible interference signal will continue to increase commensurately with TX GAIN ADJ as the portable unit becomes located further outside of the range $R_1$.

Figure 3:
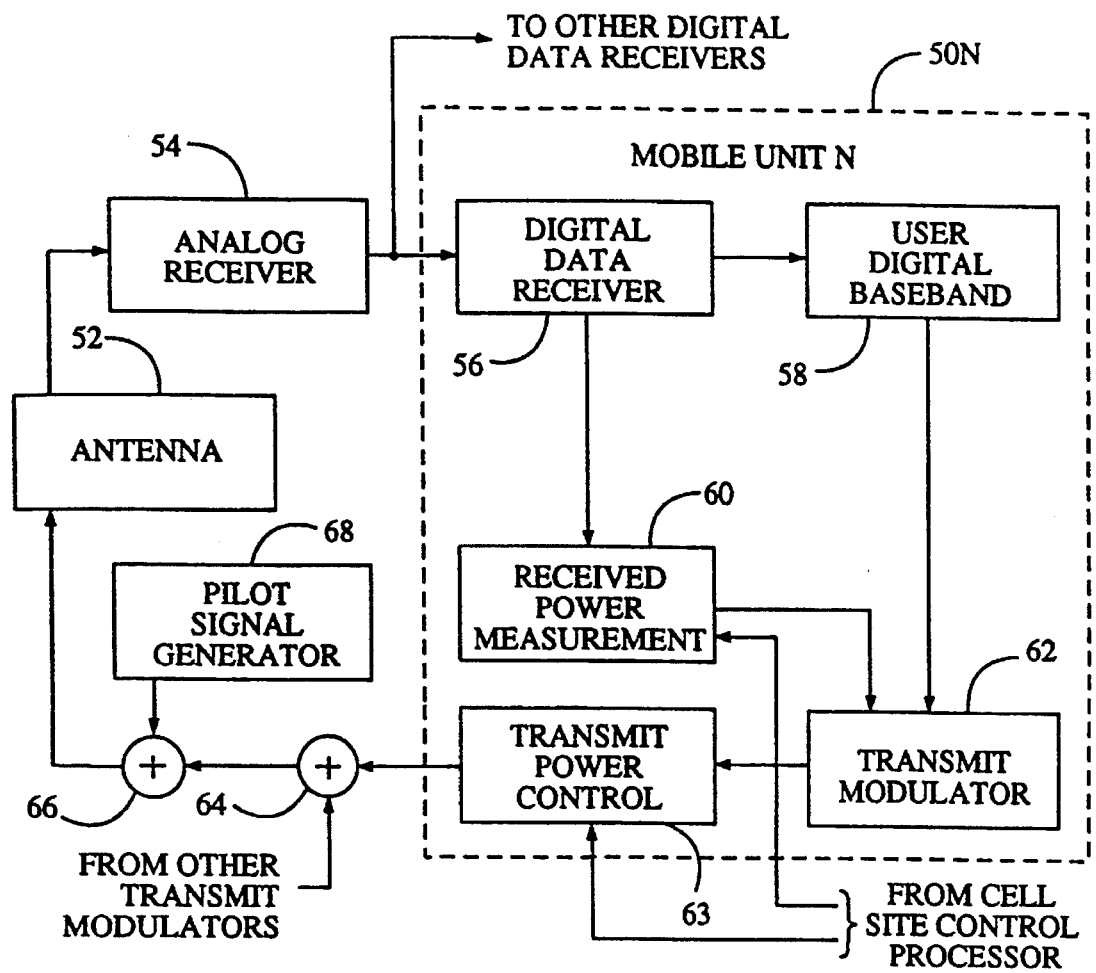
FIG. 3 is a block diagram of an exemplary cell-site with particular reference to a power control system included therein.

In order to facilitate understanding of a preferred implementation of the link quality improvement system of the invention, the power control system within the cell-site responsible for regulating the power transmitted over the reverse link will be described with reference to FIG. 3. As shown in FIG. 3, an antenna 52 is provided at the cell-site for receiving multiple portable unit transmitted signals which are then provided to analog receiver 54 for amplification, frequency downconversion and IF processing. The analog signals output from receiver 54 are provided to a plurality of receiver modules for extraction of user directed information signals, generation of power adjustment commands, and modulation of user input information signals for transmission. One such module used in communications with a particular portable unit, such as portable unit N, is module 50N.

Module 50N comprises digital data receiver 56, user digital baseband circuit 58, received power measurement circuitry 60, and transmit modulator 62. Digital data receiver 56 receives the wideband spread spectrum signals for correlating and despreading the portable unit N transmitted signal to a narrow band signal for transfer to an intended recipient communicating with portable unit N. Digital data receiver 56 provides the narrow band digital signals to user digital baseband circuitry 58. Digital data receiver 56 also provides the narrow band digital signal to received power measurement circuitry 60.

Received power measurement circuitry 60 measures the power level in the received signal from portable unit N. Received power measurement circuitry 60 in response to the measured level of power generates either a "power-up" or "power-down" power adjustment command which is input to transmit modulator 62 for transmission to portable unit N.

Should the received power measurement be less than the preset level, the appropriate power-up command data bits are generated, thus indicating that an increase in portable unit transmitter power is necessary. Similarly, if the received measurement is greater than the preset level, a power-down command is generated such that the portable unit transmitter power is reduced. The power adjustment command is utilized to maintain a nominal received power level at the cell-site exemplified by curve 40 (FIG. 2A).

The signal output from digital data receiver 56 is provided to user digital baseband circuitry 58 where it is interfaced for coupling to the intended recipient via the system controller and switch. Similarly, baseband circuitry 58 receives user information signals intended for portable unit N and provides them to transmit modulator 62.

Transmit modulator 62 spread spectrum modulates the user addressable information signals for transmission to portable unit N. Transmit modulator 62 also receives the power adjustment command data bits from received power measurement circuitry 60. The power adjustment command data bits are also spread spectrum modulated by transmit modulator 62 for transmission to portable unit N. Transmit modulator 62 provides the spread spectrum modulated signal to summer 64 where it is combined with spread spectrum signals from other module transmit modulators also located at the cell-site.

The combined spread spectrum signals are input to summer 66 where they are combined with a pilot signal provided by pilot signal generator 68. These combined signals are then provided to circuitry (not shown) for frequency upconversion from the IF frequency band to the RF frequency band and amplified. The RF signals are then provided to antenna 52 for transmission. Although not illustrated, forward link transmit power control circuitry may be disposed between summer 66 and antenna 52. This circuitry, under control of the cell-site processor, is responsive to power adjustment command signals transmitted by the portable unit which are demodulated at the cell-site receiver and provided to the cell-site control processor for coupling to the circuitry.

Figure 4:
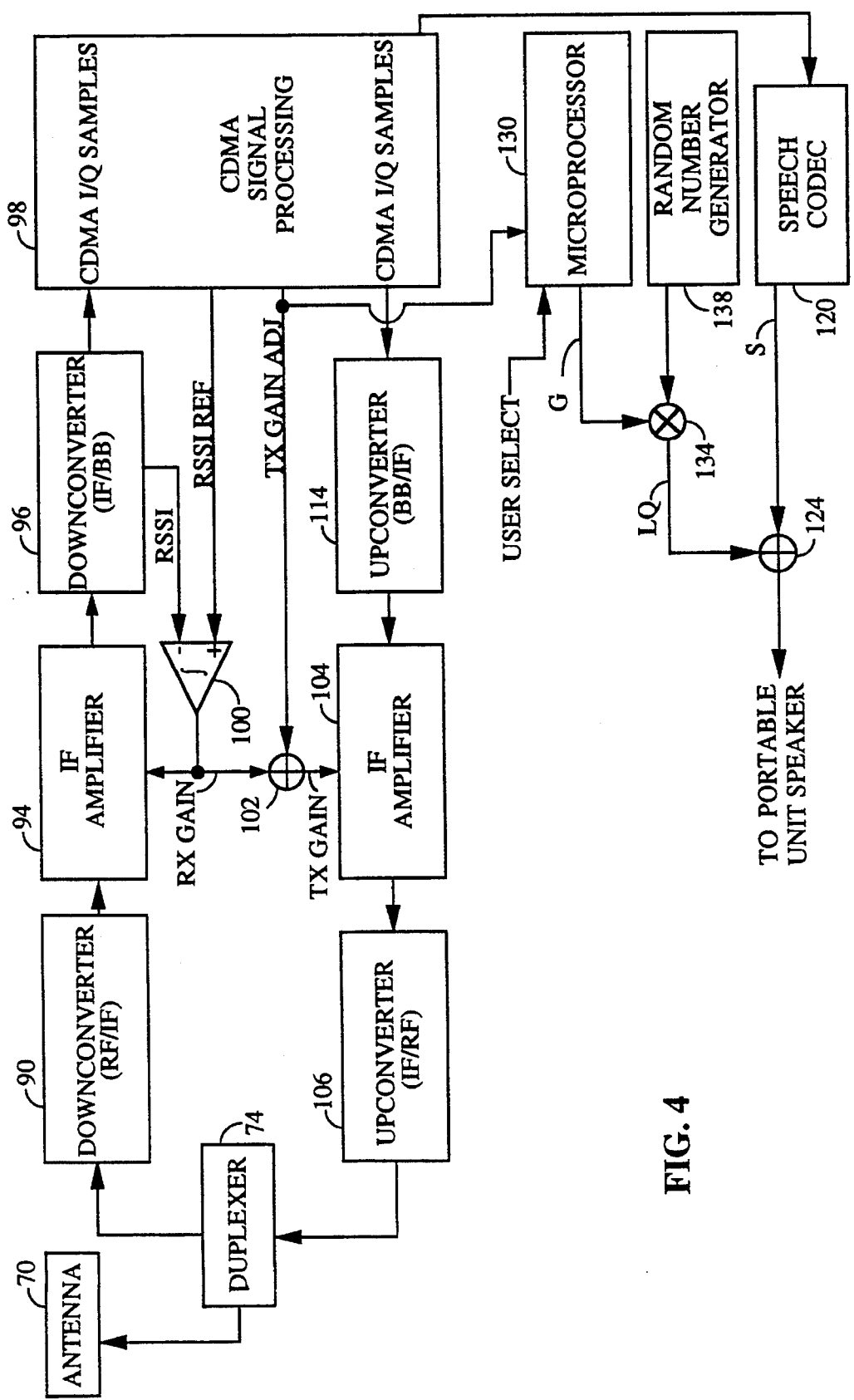
FIG. 4 is a block diagram of an exemplary portable unit illustrating particular aspects of the link quality improvement apparatus of the invention.

In FIG. 4, the portable unit, such as portable unit N, includes an antenna 70 for collecting cell-site transmitted signals and radiating portable unit generated CDMA signals. Portable unit N receives the pilot signal, setup channel signals and the portable unit N addressed signals using antenna 70, with duplexer 74 serving to route the received RF signals to frequency downconverter 90. Downconverter 90 operates to convert the received RF signals to an IF frequency. The IF frequency signals are coupled to a bandpass filter (not shown) where out of band frequency components are removed from the signals.

The filtered signals are provided to variable gain IF amplifier 94 where the signals are amplified. The amplified signals are output from amplifier 94 to an IF to baseband (IF/BB) downconverter 96 for conversion to baseband, as well as for analog to digital (A/D) conversion. The resultant digital samples of the in-phase (I) and quadrature phase (Q) CDMA signal components are provided to CDMA signal processor 98 for digital signal processing operations on the CDMA I/Q samples.

In the preferred embodiment the IF/BB downconverter 96 is also operative to generate a Received Signal Strength Indicator (RSSI) signal which is coupled to one input of comparator 100. The other input of comparator 100 is provided with an RSSI reference signal (RSSI REF) from the portable unit CDMA signal processor 98. The RSSI REF signal is indicative of a desired input power level to the CDMA signal processor 98.

The RSSI and RSSI REF signals provided to comparator 100 are compared thereby, with the resulting receiver gain control signal (RX Gain) being coupled to the IF amplifier 94 and to a summer 102. This RX Gain signal is therefore indicative of the power received by the portable unit from the cell-site. Because signal power received at the portable unit will generally be proportional to its proximity to the cell-site, the distance of the portable unit from the cell-site may be inferred from the RX Gain signal. Accordingly, the RX Gain signal may be utilized in appropriately setting the gain of amplifier 104. Summer 102 is also provided with the TX GAIN ADJ signal generated by CDMA signal processor 98 in response to the power adjustment command signals transmitted from the cell-site, with the resultant transmitter gain (TX Gain) signal being coupled to the gain control input of IF transmit amplifier 104. The TX Gain signal is used to control the gain of the amplifier 104 so as to maintain the proper power level at the output of amplifier 104 to an IF/RF Upconverter 106.

The CDMA signal processor 98 starts with the level of TX GAIN ADJ set to a nominal value. Each power-up command increases the value of TX GAIN ADJ, which corresponds to a resultant approximate 1 dB increase in amplifier gain. Each power-down command decreases the value of TX GAIN ADJ, corresponding to a resultant approximate 1 dB decrease in amplifier gain. The TX GAIN ADJ signal is converted to analog form before being supplied to summer 102 for combination with the RX Gain signal.

As shown in FIG. 4, the output of amplifier 104 is provided as an input to IF/RF Upconverter 106, while the input of amplifier 104 is supplied with the IF produced by the baseband to intermediate frequency (BB/IF) Upconverter 114. The BB/IF Upconverter 114 operates to translate the reverse link baseband CDMA I/Q samples generated by the CDMA signal processor 98 to an intermediate frequency. Amplifier 104 is a variable gain IF amplifier with the gain determined according to the TX Gain signal. The RF signal output from Upconverter 106 is then routed through duplexer 74 to the antenna 70 for transmission.

Referring again to FIG. 4, in a preferred embodiment a speech codec 120 coupled to the CDMA signal processor 98 produces an output speech signal S in response to speech information received by the portable unit from the cell-site. The CDMA I/Q Samples corresponding to the received speech information are processed by the CDMA signal processor 98, with the resulting speech parameters being provided to the speech codec 120 in digital form.

As is described hereinafter with reference to FIG. 4, in a preferred embodiment a link quality signal (LQ) in the form of a scaled level of background interference is combined with the output speech signal S in an adder 124. The adder 124 is connected to a speaker (not shown) operative to produce an output signal audible to the user of the portable unit. In accordance with the invention, the level of audible interference, i.e., the noise level, present in the signal provided to the user is determined on the basis of the magnitude of the link quality signal LQ.

As shown in FIG. 4, the TX GAIN ADJ signal is provided to a microprocessor 130 disposed to generate a noise indicator gain signal G. The noise indicator gain signal is provided to one input of a multiplier 134, while the other input of multiplier 134 is supplied with a pseudorandom sequence from a random number generator 138. The output of random number generator 138 can be characterized as noise and random number generator 138 can be considered a noise generator. The link quality signal LQ is thus seen to correspond to the resulting scaled pseudorandom sequence produced by the multiplier 134. The microprocessor 130 will generally include a look-up table of noise indicator gain signals indexed as a function of TX GAIN ADJ. In the preferred embodiment the noise indicator gain signals are monotonically related in magnitude to the value of TX GAIN ADJ for those values of TX GAIN ADJ exceeding a minimum threshold $TX_{min}$ (FIG. 2B). It is anticipated that for values of TX GAIN ADJ less than $TX_{min}$ the magnitudes of the corresponding noise indicator gain signals will be set to zero. In this way background interference noise is prevented from being injected into the portable unit audible signal in response to minor deviations in the propagation characteristics of the reverse and forward transmission paths. For values of TX GAIN ADJ greater than $TX_{min}$ (e.g., when the portable unit is separated from the cell-site by a distance in excess of range $R_1$), the magnitude of the noise indicator signals will preferably be proportional to corresponding values of TX GAIN ADJ.

The random number generator 138 produces a pseudorandom number sequence of predetermined length relative to each voice frame. In an exemplary implementation a pseudorandom sequence having a length of approximately 160 samples is utilized assuming a voice frame of length 20 msec. and a sampling rate of 8 kHz.

An alternative embodiment of the link quality improvement technique of the invention may be implemented in existing cellular systems without modification of the system portable units. This is accomplished by synthesizing within the cell-site, rather than within the portable units, the link quality signals associated with each portable unit. More specifically, the value of TX GAIN ADJ for the portable unit may be generated within the cell-site itself based on the power adjustment commands sent to the portable unit. Alternatively, each portable unit periodically transmits the cell-site the value of the particular TX GAIN ADJ signal generated therein. In either case, within the cell-site the value of the TX GAIN ADJ signal for a given portable unit are accumulated.

Figure 5:
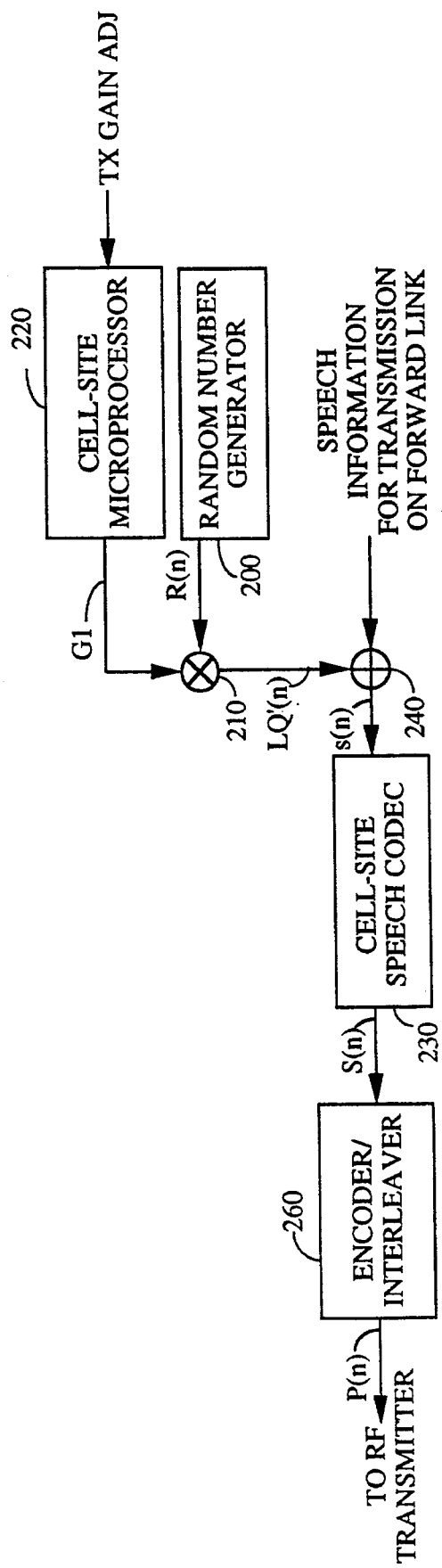
FIG. 5 is a block diagram illustrating an alternative embodiment in which the link quality improvement apparatus of the invention is disposed within the cell-site.

Referring to FIG. 5, in such an alternative embodiment the cell-site includes a random number generator 200 for providing a pseudorandom sequence to a multiplier 210. The output of random number generator 200 can be a digital noise signal and random number generator 200 may be noise generator. The pseudorandom sequence is scaled at multiplier 210 by a noise indicator gain signal G1 provided by a cell-site microprocessor 220. The cell-site microprocessor 220 will generally include a look-up table substantially identical to the look-up table included within microprocessor 130 (i.e., one in which noise indicator gain signals are indexed as a function of the TX GAIN ADJ signal).

The link quality signal LQ'(n) output from the multiplier 210 may be expressed as:

$$LQ'(n)=G1*R(n).$$

The link quality signal LQ'(n) is combined in digital adder 240 with the sequence of speech samples and the resultant s(n) is input to a cell-site speech codec 230. In certain instances it may be desired that the associated voice channel operate at a variable data rate. The intent in using a variable data rate is to lower the data rate when there is no voice activity, thereby reducing interference generated by the particular voice channel to other users. In this regard copending U.S. Patent application "VARIABLE RATE VOCODER" Ser. No. 07/713,661, filed Jun. 11, 1991, assigned to the assignee of the present invention, discloses a speech codec for processing data at four different data rates based on voice activity on a 20 msec frame basis. In a particular implementation of speech codec 230 using such a variable rate speech codec the received speech parameters may specify data rates of 9.6 kbps, 4.8 kbps, 2.4 kbps or 1.2 kbps. In such a case, the link quality signal LQ'(n) should not be sufficient to increase the nominal data rate above the rate that the speech information would require.

Referring to FIG. 5, the composite sequence s(n) output from digital adder 240 is provided to cell-site speech codec 230. Cell-site speech codec 230 vocodes s(n) to produce output data S(n). The sequence S(n) is convolutional encoded, with repetition, and interleaved by encoder/interleaver 260 in order to provide error detection and correction functions which allow the system to operate at a much lower signal-to-noise and interference ratio. Techniques for convolutional encoding, repetition, and interleaving are well known in the art. The resulting encoded speech parameters P(n) are generally summed with the pilot and setup carriers and with the other voice carriers and modulated onto an RF carrier.

In both the portable unit implementation of FIG. 4 and the cell-site implementation of FIG. 5, the method of creating the noise may take on a variety of forms. On method which might prove the most efficient is to modify speech codec parameters to increase the background noise in response to the TX GAIN ADJ signal.

A myriad of alternative embodiments are evident upon examination of the present invention. The present invention seeks to alert the user of a diminishing signal level by adding white noise to the audible signal heard by the user. Many other alternative ways of alerting the user are envisioned such as a periodic tone which varies in frequency with TX GAIN ADJ or a continuous tone that increases in volume with TX GAIN ADJ. Alternatively a less intrusive manner of implementing the present invention is to provide a visual display which indicates that relative level of TX GAIN ADJ.

The previous description of the preferred embodiments are provided to enable any person skilled in the art to make or use the present invention. Various modifications to these embodiments will be readily apparent to those skilled in the art, and the generic principals defined herein may be applied to other embodiments without the use of the inventive faculty. For example, the teachings of the invention may be applied to any communication system in which information, i.e., power control data, is transmitted to a remote station on an forward link in order to improve performance on the reverse link. Thus, the present invention is not intended to be limited to the embodiments shown herein, but is to be accorded the widest scope consistent with the principals and novel features disclosed herein.

I claim:

1. In a communication system in which system users communicate information signals between one another via at least one cell-site using code division multiple access (CDMA) spread spectrum communication signals, a system for improving quality of signals transmitted to said at least one cell-site from a portable communication unit utilized by one of said system users, said cell-site and said portable communication unit each including a transmitter and a receiver wherein said receiver of said portable communication unit is operative to provide an output signal to said one system user, said system comprising:

first power measurement means, coupled to said cell-site receiver, for measuring signal power in each CDMA communication signal directed to said cell-site from said transmitter of said portable communication unit;

first power adjustment command generator means, coupled to said cell-site transmitter and to said first power measurement means, for generating a first set of power adjustment commands corresponding to deviations in power measurements of said first power measurement means from a first predetermined power level, said cell-site transmitter transmitting said first set of power adjustment commands;

means for generating a link quality signal at least partially in response to said first set of power adjustment commands; and summing means for combining said link quality signal with said output signal provided to said one system user;

whereby in response to said link quality signal said one system user may adjust the position of said portable communication unit in order to improve said quality of said signals transmitted to said cell-site.

2. The signal quality improvement system of claim 1 wherein said means for generating said link quality signal is disposed within said portable communication unit and wherein said link quality signal is indicative of the level of signal power received at said cell-site relative to a predetermined optimum level, said means for generating a link quality signal being connected to said summing means.

3. The signal quality improvement system of claim 1 further including speech codec means for generating said output signal as an audible signal, and wherein said means for generating said link quality signal includes means for generating an audible link quality signal.

4. The signal quality improvement system of claim 3 wherein said means for generating said link quality signal includes noise generator means for producing a background noise signal, and further includes means for scaling said background noise signal in accordance with said first set of power adjustment commands.

5. The signal quality improvement system of claim 4 wherein said means for scaling includes:

microprocessor means for accumulating said first set of power adjustment commands and for producing a noise indicator gain signal in response thereto; and means for multiplying said background noise signal by said noise indicator gain signal.

6. The signal quality improvement system of claim 1 wherein said means for generating said link quality signal is disposed within said cell-site, said cell-site transmitter including means for transmitting said link quality signals to said portable communication unit.

7. The signal quality improvement system of claim 6 wherein said means for generating said link quality signal includes a noise generator for producing a background noise signal, and further includes means for scaling said background noise signal in accordance with said first set of power adjustment commands.

8. The signal quality improvement system of claim 7 wherein said means for scaling includes:

microprocessor means for accumulating said first set of power adjustment commands and for producing a noise indicator gain signal in response thereto; and means for multiplying said background noise signal by said noise indicator gain signal.

9. The signal quality improvement system of claim 1 further including signal processor means, disposed in said portable communication unit, for:

accumulating said first set of power adjustment commands into an accumulated set of power adjustment commands;

determining an average value corresponding to said accumulated set; and comparing said average value with a predetermined gain control level setting, and, based on said comparison, generating a transmitter gain adjustment signal.

10. The signal quality improvement system of claim 9 further including:

microprocessor means for providing said link quality signal in response to said transmitter gain adjustment signal; and amplifier means, operatively coupled to said transmitter of said portable communication unit, for receiving said transmitter gain adjustment signal, said amplifier means including means for varying signal power of said transmitter in accordance with said transmitter gain adjustment signal.

11. The signal quality improvement system of claim 5 wherein said microprocessor means includes means determining an average value of said first set of power adjustment commands, and further includes means for setting magnitude of said noise indicator gain signal in accordance with said average value wherein said magnitude is a function of said average value.

12. The signal quality improvement system of claim 2 further including amplifier means, coupled to said transmitter and said receiver of said portable communication unit, said amplifier means responsive to said first set of power adjustment commands directed to said portable communication unit, for adjusting transmission signal power of said portable communication unit.

13. In a communication system in which system users communicate information signals between one another via at least one cell-site using code division multiple access (CDMA) spread spectrum communication signals, a method for improving quality of signals transmitted to said at least one cell-site from a portable communication unit utilized by one of said system users, said cell-site and said portable communication unit each including a transmitter and a receiver wherein said receiver of said portable communication unit is operative to provide an output signal to said one system user, said method comprising the steps of:

measuring signal power in each CDMA communication signal directed to said cell-site from said transmitter of said portable communication unit;

generating a first set of power adjustment commands corresponding to deviations in power measurements of said first power measurement means from a first predetermined power level, said cell-site transmitter transmitting said first set of power adjustment commands;

generating a link quality signal at least partially in response to said first set of power adjustment commands; and combining said link quality signal with said output signal provided to said one system user;

whereby in response to said link quality signal said one system user may adjust the position of said portable communication unit in order to improve said quality of said signals transmitted to said cell-site.

14. The method of claim 13 further including the step of generating said output signal as an audible signal, said step of generating said link quality signal including the step of generating an audible link quality signal.

15. The method of claim 14 wherein said step of generating said link quality signal includes the step of producing a background noise signal, and further includes the step of scaling said background noise signal in accordance with said first set of power adjustment commands.

16. The method of claim 15 wherein said step of scaling includes the steps of:

accumulating said first set of power adjustment commands and producing a noise indicator gain signal in response thereto; and multiplying said background noise signal by said noise indicator gain signal.

17. The method of claim 13 further including the step of transmitting said link quality signals to said portable communication unit.

18. The method of claim 13 further including the steps of:

accumulating said first set of power adjustment commands into an average value, comparing said average value with a predetermined gain control level setting, and, based on said comparison, generating a first transmitter gain adjustment signal.

19. The method of claim 18 further including the steps of:

compiling a table in which values of link quality signals are indexed as a function of corresponding values of transmitter gain adjustment signals, and determining a value of said link quality signal from said table by using said first transmitter gain adjustment signal as an index into said table.

20. The method of claim 16 further including the steps of:

determining an average value of said first set of power adjustment commands, and setting magnitude of said noise indicator gain signal in accordance with said average value, said magnitude being inversely related to said average value.

21. The method of claim 13 further including the step of adjusting transmission signal power of said portable communication unit in response to said first set of power adjustment commands.

22. A method of providing a communication link quality indication in a communication system having a cell-site and having a set of portable units wherein at least one of said set of portable communication units has a plurality of positions in relation to said cell-site, the method comprising the steps of:

measuring a power level of a signal received from a particular portable unit of said set of portable communication units;

comparing said measured power level to a desired power level and producing a power adjustment indication based on a difference between said measured power level and said desired power level;

providing to said particular portable unit said power adjustment indication;

accumulating at said particular portable unit a set of said power adjustment indications and producing an average value thereof; and producing at said particular portable unit a communication link quality indication when said average value exceeds a predetermined threshold;

wherein the position of said particular portable communication unit is adjusted in relation to the cell-site in response to the communication link quality indication.

23. The method of claim 22 wherein said communication link quality indication is an audible noise signal.

24. The method of claim 23 wherein said audible noise signal increases in volume as said communication link quality indication further exceeds said predetermine threshold.

25. The method of claim 22 wherein said communication link quality indication is presented on a visible display.

26. The method of claim 22 wherein said communication link quality indication is an audible tone.

27. The method of claim 26 wherein said audible tone is periodic.

28. The method of claim 27 wherein the period of said periodic audible tone increases is a function of the amount by which said average value exceeds said predetermined threshold.

29. The method of claim 22 wherein said average value controls said power level of said signal received from said particular portable unit at said cell-site.

30. A portable radio that communicates in a wireless communication environment and has a communication link quality indication capability, the radio comprising:

a receiver section that receives signals from the wireless communication environment;

a first processor, coupled to the receiver, for processing the received signals to generate a gain adjust signal;

a second processor, coupled to the first processor, for generating a noise indicator signal in response to the gain adjust signal;

a random number generator for generating a number sequence; and a first summer, coupled to the second processor and the random number generator, for generating the communication link quality indication in response to the noise indicator and the number sequence.

31. The radio of claim 30 and further including:

a speech codec, coupled to the first processor, for generating a speech signal;

a second summer, coupled to the speech codec and the first summer, for generating an audible output signal from the speech signal and the communication link quality indication; and an audio transducer, coupled to the second summer, for emitting the audible output signal.

32. The radio of claim 30 wherein the number sequence is a pseudorandom number sequence.

33. A method for providing a communication link quality indication in a portable radio that communicates in a wireless communication environment, the method comprising the steps of:

receiving signals from the wireless communication environment;

generating a gain adjust signal in response to the received signals;

generating a noise indicator signal in response to the gain adjust signal;

generating a number sequence; and summing the noise indicator and the number sequence to generate the communication link quality indication.

34. The method of claim 33 and further including the steps of:

generating a speech signal from a speech codec;

summing the speech signal and the communication link quality indication to generate an audible output signal; and emitting the audible output signal through an audio transducer.

* * * * *